United States Patent [19]
Fujiwara et al.

[11] Patent Number: 5,440,411
[45] Date of Patent: Aug. 8, 1995

[54] OPTICAL SCAN TYPE DISPLAY DEVICE WITH OPTICAL FIBER MELTED ONTO A SUBSTRATE

[75] Inventors: Sayuri Fujiwara; Akitsugu Hatano, both of Nara; Yoshihiro Isumi, Kashihara, all of Japan

[73] Assignee: Sharp Kabushiki Kaisha, Osaka, Japan

[21] Appl. No.: 88,588

[22] Filed: Jul. 7, 1993

[30] Foreign Application Priority Data

| Jul. 9, 1992 | [JP] | Japan | 4-182281 |
| Dec. 11, 1992 | [JP] | Japan | 4-331988 |
| Jun. 18, 1993 | [JP] | Japan | 5-147719 |

[51] Int. Cl.$^6$ ............... G02F 1/1335; G02F 1/1343; G02F 1/135
[52] U.S. Cl. ........................ 359/42; 359/58; 359/72
[58] Field of Search .............. 359/42, 72, 58, 60

[56] References Cited

U.S. PATENT DOCUMENTS

5,307,186  4/1994  Izumi et al. .................. 359/42

FOREIGN PATENT DOCUMENTS

| 0490484 | 6/1992 | European Pat. Off. |
| 0542579 | 5/1993 | European Pat. Off. |
| 62-127720 | 6/1987 | Japan ..................... 359/72 |
| 1-173016 | 7/1989 | Japan . |
| 1173016 | 7/1989 | Japan . |
| 2-89029 | 3/1990 | Japan . |
| 2-134617 | 5/1990 | Japan . |
| 2134617 | 5/1990 | Japan . |
| 5150222 | 6/1993 | Japan ..................... 359/42 |

OTHER PUBLICATIONS

U.S. Ser. No. 07/789,171, filed Nov. 1991 to Kimura et al.

*Primary Examiner*—Anita Pellman Gross
*Assistant Examiner*—Charles Miller
*Attorney, Agent, or Firm*—David G. Conlin; Robert F. O'Connell; Milton Oliver

[57] ABSTRACT

An optical scan type display device is provided to have an excellent display characteristic so that it may achieve a large-screen and high-resolution display. The display device is arranged to have a pair of glass substrates and a liquid crystal material sealed therebetween. On one of the glass substrates, there are formed a plurality of optical waveguides, a plurality of signal wires ranged vertically to the optical waveguides, a plurality of pixel electrodes located on sections defined by the optical waveguides and signal wires, and a plurality of light switching elements located at the crossing spots between the optical waveguides and the signal wires. The pixel electrodes are selectively driven in response to the light signal applied through the signal wires and the light switching elements. The optical waveguides are formed of optical fibers and the surface of the substrate is mirror-finished.

19 Claims, 13 Drawing Sheets

OPTICAL SCAN TYPE DISPLAY DEVICE WITH OPTICAL FIBER MELTED ONTO A SUBSTRATE

BACKGROUND OF THE INVENTION

1. Field of the Invention

The present invention relates to a display device of an optical scan type which is expected to apply to audio-visual equipment provided with a display such as a TV, office-automation equipment such as a personal computer, or optical information processing equipment.

2. Description of the Related Art

In recent days, a matrix type liquid crystal display device has been requested to have larger capacity. That is, as the display device has higher resolution, it is requested that the number of pixels per inch included in the display device be increased from 400×600 to 1000×1000 or more. Likewise, the size of the display screen has been requested to increase from 10 to 20 inches or more.

To realize such requests, however, the active matrix type liquid crystal display device, in particular, the liquid crystal display device employing thin film transistors each serving as a switching element may have a shortcoming. That is, the wires are made longer and the resistance on the wire is made larger accordingly. As a result, the resistance on the wire and the floating capacitance may bring about a delay of a signal waveform. On the other hand, the simple matrix type liquid crystal display device also has a shortcoming that as the scan lines corresponding to a large screen are increased in number, a voltage ratio of selected pixels to non-selected pixels, that is, a duty ratio cannot be kept proper, thereby degrading the display characteristic.

In order to overcome these shortcomings, a high-resolution optical scan type display device has been proposed in Japanese Patent Laid-Open Application 1-173016, 2-89029, and 2-134617, etc. These types of display devices use a light signal for excluding these shortcomings resulting from the resistance and the floating capacitance on the wire.

The inventors of the present application know that the optical scan type display device is basically arranged to have a pair of substrates opposed to each other and a liquid crystal layer laid between these substrates. These substrates are both made of transparent glasses. On a base substrate, a plurality of optical waveguides are located in a horizontal manner. A plurality of signal wires are located in a vertical manner so that these signal wires crossed at right angles with those optical waveguides, respectively. Each optical waveguide includes a luminous portion at one end. By activating each luminous portion, a light signal is propagated through the optical waveguide connected to the luminous portion. At each crossing point between the optical waveguide and the signal wire, a light switching element is formed on the optical waveguide. The light switching element is made of an optical waveguide layer. One end of the light switching element is vertically laid between the signal electrode and the optical waveguide. The other end of the light switching element is vertically laid between the optical waveguide and a pixel electrode. At the switching element on the optical waveguide, a V-grooved light scattering portion is formed for radiating a light signal propagated through the optical waveguide to the switching element. Further, at each section being formed by the optical waveguide and the signal wire and including the switching element, the pixel electrode is buried on the section area so that the pixel electrode is partially overlapped on the optical waveguide. On the surface of the base substrate, an orientation film is formed in a manner to cover the surface.

In turn, on the inside of the other substrate opposed to the above base substrate, there is formed an opposed electrode. The opposed electrode is made of a transparent conductive material. On the opposed electrode, a light cut-off layer is formed at each location corresponding to each switching element on the base substrate. For covering the inside of the opposed substrate formed as above, an orientation film is formed. A liquid crystal layer is laid and pasted between the base substrate and the opposed substrate and sealed by a sealing member.

The optical waveguide is an ion diffusion type waveguide which is made by diffusion metal ions on the base substrate made of glass. The optical waveguide has a semi-circular section and is buried in the base substrate so that the surface of the optical waveguide is on the same level as the surface of the base substrate. The part of the optical waveguide being located on the same level as the surface of the base substrate is covered by a clad layer formed on the overall surface of the base substrate. This clad layer is made of an $SiO_2$ film.

Next, the description will be oriented to the operation of the liquid crystal display device of an optical scan type active matrix type arranged as described above.

The luminous portion serves to fire a light scan signal. The light signal is conveyed inside of the optical waveguide. The light is scattered through the light scattering portion provided on the optical waveguide. Part of the scattered light is applied onto the light switching element. The light switching element serves to change its impedance according to the intensity of light applied thereon through the photoconductive effect. The change of the impedance of the light switching element depending on the brightness and darkness of the light leads to controlling flow of current between the signal wire and the pixel electrode. That is, in the light-applied state, the light switching element lowers its impedance so that the signal wire may be electrically connected with the pixel electrode. This connection results in being able to apply a data signal onto the liquid crystal layer laid between the pixel electrode and the opposed electrode through the signal wire. In the dark state, on the other hand, no data signal is allowed to be applied onto the liquid crystal layer between the pixel electrode and the opposed electrode in a manner that the voltage applied onto the liquid crystal layer in the bright state may be maintained.

In place of an electric gate signal, which has been heretofore used for a thin film transistor element, a light signal propagated through the optical waveguide may drive the light switching element. In general, the light switching element included in the optical scan type liquid crystal display device may use as a photoconductive material amorphous silicon hydride (a-Si:H), which may be formed on a relatively large area at a low temperature by means of the CVD method.

The aforementioned structure of the known optical scan type active matrix LCD has some problems. At first, when realizing a large screen, a propagating characteristic is not proper in the optical waveguide for propagating a light signal. For example, consider a screen of diagonally 40 inches. The screen size is about 88.4×49.8 cm. Such a large screen needs an optical waveguide of about 90 cm. For the screen of diagonally 20 inches, the screen size is about 44.3×24.9 cm. It needs an optical waveguide of about 45 cm, and for the screen of diagonally 80 inches, the screen size is about 132.8×74.7 cm, with an optical waveguide of about 130 cm. These sizes are applicable for the aspect ratio 16:9.

Table 1 shows the propagation characteristics in case of changing the propagation loss of the optical waveguide and the length of the optical waveguide.

TABLE 1

(1-1) Propagation Loss α
(a) 0.2 dB/cm
(b) 0.1 dB/cm
(c) 0.05 dB/cm
(d) 0.02 dB/cm
(e) 0.01 dB/cm
(f) 0.005 dB/cm
(g) 0.001 dB/cm (1-2) Intensity Ratio after 45 cm propagation
(a) 12.59%
(b) 35.84%
(c) 59.57%
(d) 81.28%
(e) 90.16%
(f) 94.95%
(g) 98.97%

(1-3) Intensity Ratio after 90 cm propagation
(a) 1.58%
(b) 12.59%
(c) 35.48%
(d) 66.07%
(e) 81.28%
(f) 90.16%
(g) 97.95%

(1-4) Intensity Ratio after 130 cm propagation
(a) 0.25%
(b) 5.01%
(e) 22.39%
(d) 54.95%
(e) 74.13%
(f) 86.10%
(g) 97.05% where (a) to (g) of (1-1) correspond to (a) to (g) in each of (1-2) through (1-4), respectively.

The propagation loss α in the list (1) may be derived by the following expression (1)

$$\alpha = \{-10 \times \log_{10}(P_{out}/P_{in})\}/L \qquad (1)$$

where α is a propagation loss, L is an optical waveguide length, $P_{in}$ is an intensity of light given when it enters into the optical waveguide, and $P_{out}$ is an intensity of light given when it gets out of the optical waveguide.

As indicated in Table 1, for example, optically scanning the diagonal 60 inches, it is damped to 22% of the intensity of incident light in the propagation loss of 0.05 dB/cm, thus a light source with high output power is required in order to obtain a sufficient light intensity at the furthermost location from the light source, thereby it is desirable to have the propagation loss equal to or less than 0.02 dB/cm, more preferably 0.01 dB/cm. Similarly, for the diagonal 40 inches, it is desirable to have the propagation loss equal to or less than 0.05 dB/cm or 0.02 dB/cm, and for the diagonal 20 inches, it is desirable to have the propagation loss equal to or less than 0.1 dB/cm.

By the way, for producing the light guide path, the following methods (a) through (d) may be referred.

(a) Pasting an optical fiber on the rear surface of a glass substrate;

(b) Patterning an organic film and an inorganic film;

(c) Using the ion exchange method and the proton exchange method;

(d) Forming a groove in a glass substrate and burying a fiber into the groove or molding a resin in the groove.

Those methods have the following problems.

For the method (a), a transmission loss of the optical fiber is as small as 100 dB/km or less. It means that the optical fiber itself has an excellent transmitting efficiency. However, since the optical fiber is pasted on the rear surface of the glass substrate, scattering of the light signal is brought about until it enters into the light switching element. This results in lowering the utilization efficiency of light in the light switching operation.

For the method (b), it is advantageous in light of the manufacturing process. The propagation loss of the currently available organic material is larger than that of the optical fiber by one digit, so that the propagation efficiency of light is made worse. In case of using an inorganic material in the method (b), it is difficult to obtain as high a propagating characteristic as the optical fiber through the effect of the deposition technique.

Likewise, the method (c) has difficulty in obtaining a predetermined film thickness and being the larger propagation loss.

For the method (d), it is considered that the propagation loss of the optical waveguide formed by molding the resin in the groove is equivalent to that of the organic films of the method (b), thus the propagation efficiency of light is not reasonable. On the other hand, in case of filling a fiber into the grooves and then fixing with a pasting agent, it is expected to obtain sufficient propagation characteristics since the propagation loss of the fiber used is small, but because of the heat resistance, the thermal expansion coefficients, etc., of the pasting agent, the heat history of the resin in the manufacturing process, concretely, that is, because of the shrinkage of the pasting agent through the repetition of the change of the heating temperature of the resin from a high temperature of about 200° to 250° C. to a room temperature or a lower temperature, then it will have a possible danger such that the fiber will be distorted and resulting in increasing the propagating loss. Therefore, the materials having a high heat resistibility of the process heat or more must be used. The above description is also applicable for molding the resin into the grooves.

In addition, in a state that the fiber is filled therein, a surface thereof is rough and it is difficult to form an element thereon. Also, in order to induce the light into the switching element from the optical waveguide, the clad layer of the surface must be removed, and in that degree, the propagation loss of the optical waveguide increases drastically.

Therefore, those methods have difficulty in producing an optical waveguide having an excellent propagating characteristic.

Then, consider the display device having a lot of scan lines. For example, if the number of necessary scan lines is 1125 as in a high-definition TV, a ratio of a selecting/non-selecting time per one scan line is as small as 1/1124 if such a display device is driven by scanning the lines in sequence. However, the known light switching element arranged as described above has difficulty in charging the liquid crystal for a quite short time. Hence, the known light switching element arranged as described above needs to have a more improved characteristic.

SUMMARY OF THE INVENTION

It is an object of the present invention to provide an optical scan type display device which provides a light guide path having an excellent light propagating characteristic by improving the production method of the optical waveguide substrates, and to provide a display device having a large screen high resolution with a more excellent display characteristic.

The object of the present invention can be achieved by an optical scan type display device which is so arranged that a liquid crystal material is sealed between two substrates and the liquid crystal material is served as a display medium, the optical scan type display device includes a plurality of optical waveguides disposed on one of the substrates and arranged in parallel each other, a plurality of signal wires disposed on the one of the substrates and arranged in parallel each other in such a direction that the plurality of signal wires cross with the plurality of optical waveguides, respectively, a plurality of pixel electrodes, each of the plurality of pixel electrodes being formed on an area defined by the plurality of optical waveguides and the plurality of signal wires, respectively, and a plurality of light switching elements, each of the plurality of light switching elements being disposed at a location where any one of the plurality of optical waveguides intersects any one of the plurality of signal wires respectively, each of the plurality of light switching elements being adapted to perform a switching in response to a signal light transmitted through each of the optical waveguides, respectively, the plurality of pixel electrodes being arranged in such a manner that each of the pixel electrodes being selectively driven in response to a signal applied through any one of the plurality of signal wires and any one of the light switching elements, the plurality of optical waveguides being formed on the one of two substrates by using an optical fiber, at least an optical waveguide portion of a surface of the one of two substrates being arranged to be flat after forming the optical waveguide.

Preferably, the substrate has a flatness of the optical waveguide portion within a range of $\pm 0.5$ μm.

The substrate of the optical waveguide is optically abraded so that a propagation loss thereof is equal to 0.1 dB/cm or lower.

All portions of the surface of the one of two substrates are arranged to be flat.

The substrate has a flatness of the all portions of the surface on one of two substrates is within a range of $\pm 0.5$ μm.

The substrate is arranged in such a manner that the flatness of the substrate is mirror-finished by polishing.

The optical fiber provides a light cut-off layer around a clad layer.

The optical waveguide is formed by burying optical fibers in grooves provided in the one of two substrates.

The optical waveguide is formed by melting an optical fiber on the one of two substrates.

Preferably, the switching element is made of a diode.

More preferably, the diode is a pin diode of a semiconductor.

The pin diode of the semiconductor is formed of amorphous silicon hydride or amorphous Silicon germanium hydride.

The diode is a hereto-junction type pin diode of a semiconductor.

At least one of a p-type layer and an n-type layer of the hereto-junction type pin diode is formed of a semiconductor material having a larger optical band gap than that of an i-type layer.

The hetero-junction type pin diode is formed of amorphous silicon hydride or amorphous silicon germanium hydride.

The diode is a Schottky diode.

The optical waveguide has a luminous portion and the luminous portion is a light-emitting diode array.

The optical waveguide has a luminous portion and the luminous portion is a laser diode array.

A driving system of the optical scan type display device is an active matrix driving system.

Striped opposite electrodes are formed on the other one of the two substrates opposite to the one of two substrates, and a display block composed of a plurality of opposed electrodes is driven in a simple multiplexing manner.

In operation, the optical fiber-is used for the optical waveguide, resulting in lowering a propagation loss, and the surface of the optical waveguide in the switching element is flatted, resulting in increasing an efficiency of using light and also resulting in easily forming the switching element. The pin-structured diode is used for the light switching element employs, thereby utilizing a reverse bias characteristics of the diode, resulting in taking a large change of impedance with respect to shading of light. That is, it results in taking a large on/off ratio of switching operation.

As described above, by utilizing the optical waveguide having high efficiency of using light and the diode structure having sufficient characteristics, resulting in efficiently achieving the light scanning for the large screen, and resulting in sufficiently performing the light switching operation by the light signal even if the signal lines increase, then as a consequence, the optical scan type display device of the present invention enables to provide a high quality display device having a large screen with a high resolution.

According to the optical scan type display device of the present invention, in the first aspect, the optical scan type display device is arranged to use the optical fiber for the optical waveguide and abrade the surface of the substrate on which the optical waveguide is formed. As a result of the abrasion, the surface of the substrate has a propagating loss as small as 0.1 dB/cm. Hence, the using efficiency of light can be made higher so that the screen of the display device may be achieved.

The optical fiber is melt on the glass substrate for forming the optical waveguide. Hence, it is a high heat resistive and suppressive in distortion resulting from the heat stress to be suffered in the manufacturing process, so that the optical waveguide may be highly reliable. Hence, the light signal is allowed to be quite efficiently and uniformly guided to the light switching element, resulting in increasing an "on" current at the light switching element. This advantage may offer a large-screen and high-resolution display device.

The light switching element employs a diode structure. Hence, the combination of an excellent on/off ratio of the switching element and an excellent light propagating characteristic of the optical waveguide results in being able to achieve a very large on/off ratio for an excellent switching characteristic. Hence, this display device may have a large screen and high resolution.

The light switching element uses as its material a-Si:H or a-SiGe$_x$:H which is excellent in the photoconductive effect. The light switching element may offer more excellent light absorption and a larger on/off ratio.

At least one of a p-type layer and an n-type layer of the semiconductor material of the light switching element uses a material with a large optical wide band gap, so that the light absorption may be made more excellent. The resulting light switching element may be more responsive to light.

A Schottky structure is used for forming the light switching element. This structure does not need a doping layer of the semiconductor. Hence, the manufacturing process of the light switching element is made simpler and thus the manufacturing efficiency may be improved.

Since the luminous diode array is used for the luminous portion of the optical waveguide, the electric arrangement of the luminous portion is made more compact and can be manufactured at low cost.

The laser diode array is used for the luminous portion of the optical waveguide. Hence, the display device may offer a high output.

The active matrix system is used for driving the display device. This system makes contribution to realizing a high-contrast and high-resolution display.

The display area for a plurality of linear electrodes is assumed as one unit block. One optical waveguide serves to select one block. This makes it possible to easily increase the scan lines in number while keeping a duty ratio constant.

Further objects and advantages of the present invention will be apparent from the following description of the preferred embodiment of the invention as illustrated in the accompanying drawings.

DESCRIPTION OF THE PREFERRED EMBODIMENTS

Figure 1:
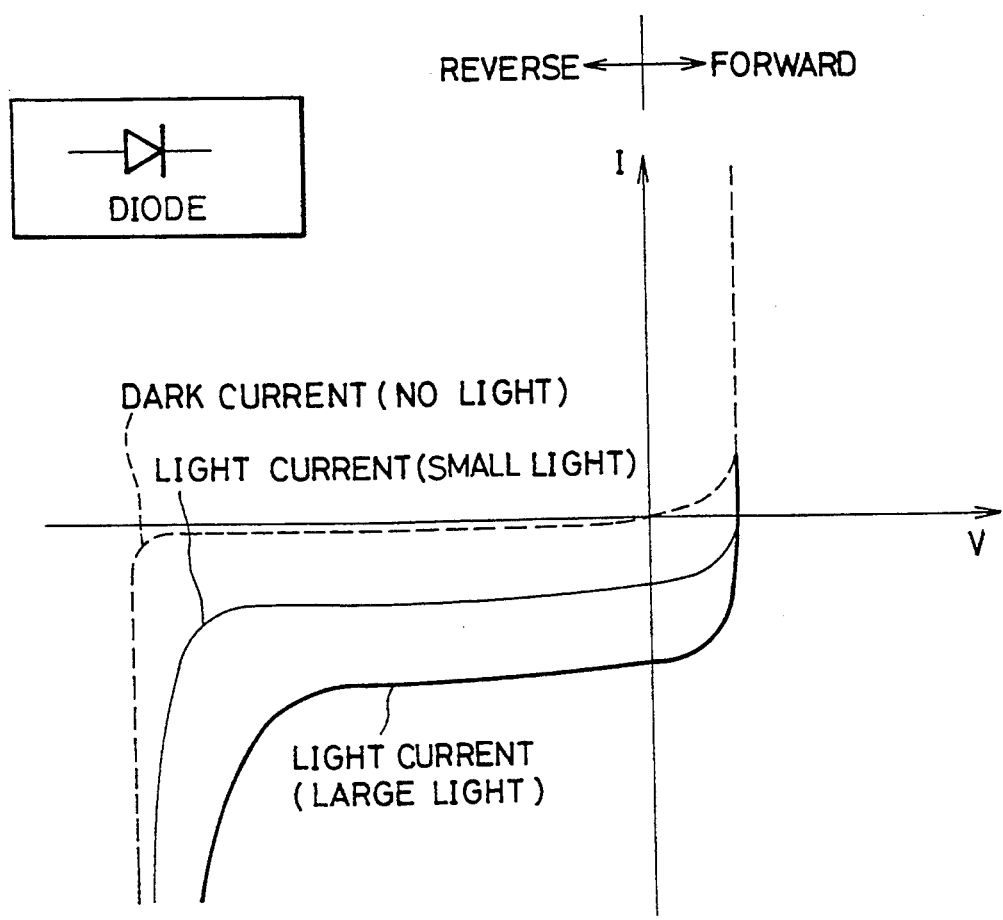
FIG. 1 is a graph showing a voltage to current characteristic of a diode included in an optical scan type liquid crystal display device according to a first embodiment of the present invention.

Referring to the accompanying drawings, a preferred embodiment of an optical scan type display device according to the present invention will be described.

In order to realize a large direct-view display in the field of an optical scan type liquid crystal display device, it is greatly influenced by the propagating characteristic of the optical waveguide Y.

Table 2 lists a general propagation loss, a light intensity ratio after 90-cm propagation of light and a light intensity ratio after 40-cm propagation of light of the optical waveguide about some manufacturing materials.

TABLE 2

| (2-1) Light Waveguide |
|---|
| (a) Quartz system optical fiber |
| (b) Plastic system optical fiber |
| (c) Tl$^+$ diffusion glass |
| (d) Photo polymeric polymer (PCZ) |
| (e) SiO$_2$ using the flame deposition method |
| (2-2) Propagation Loss $\alpha$ (Wavelength $\lambda$) |
| (a) $2 \times 10^{-5}$ dB/cm (850 nm) |
| (b) $1 \times 10^{-3}$ dB/cm (650 nm) |
| (c) 0.1 dB/cm (633 nm) |
| (d) 0.2 dB/cm (633 nm) |
| (e) 0.2 dB/cm (633 nm) |
| (2-3) Intensity Ratio after 90 cm propagation |
| (a) 99.96% |
| (b) 97.95% |
| (c) 12.59% |
| (d) 1.58% |
| (e) 1.58% |
| (2-4) Intensity Ratio after 40 cm propagation |
| (a) 99.98% |
| (b) 99.08% |
| (c) 39.81% |
| (d) 15.85% |
| (e) 15.85% | where (a) to (e) in (2-1) correspond to (a) to (e) in each of (2-2) through (2-4), respectively.

The propagation loss α in the list (2-1) may be derived by the following expression (2)

$$\alpha = \{-10 \times \log_{10}(P_{out}/P_{in})\}/L \quad (2)$$

where α is a propagation loss, L is an optical waveguide length, $P_{in}$ is an intensity of light given when it enters into the optical waveguide, and $P_{out}$ is an intensity of light given when it gets out of the optical waveguide.

As is understood from the list (2-1), it is better to make the optical waveguide by using an optical fiber with α<0.1 dB/cm for efficiently transmitting a light signal applied from the luminous portion 1 to the light switching element 3.

The light switching element employs a diode structure for improving the switching characteristic. The diode used may be a pin diode, a Schottky diode, or an MIS type diode. The diode, in general, indicates a current to voltage characteristic as shown in FIG. 1 in the dark state. As indicated by a broken line of FIG. 1, the current value I enters into a high impedance state in which the current value I comes closer to "0". This is because the energy barrier inhibits injection of carriers. In the light-applying state, though the injection of carriers is inhibited, as shown by a real line of FIG. 1, the influence of carriers generated by light is dominating as the light intensity is increasing (In FIG. 1, a thin line indicates a weak light intensity and a thick line indicates a strong light intensity). Hence, the low impedance may be maintained in the reversely biased state. Therefore, the light switching element 3 uses a diode structure and by using a reversely-biased characteristic the change of impedance (on/off ratio) for the bright and the dark states may be enlarged. These diode characteristics are discussed in detail in "Basis of Semiconductor Device (published by Ohm Publishing Co.,Japan)".

[Embodiment 1]

Figure 2:
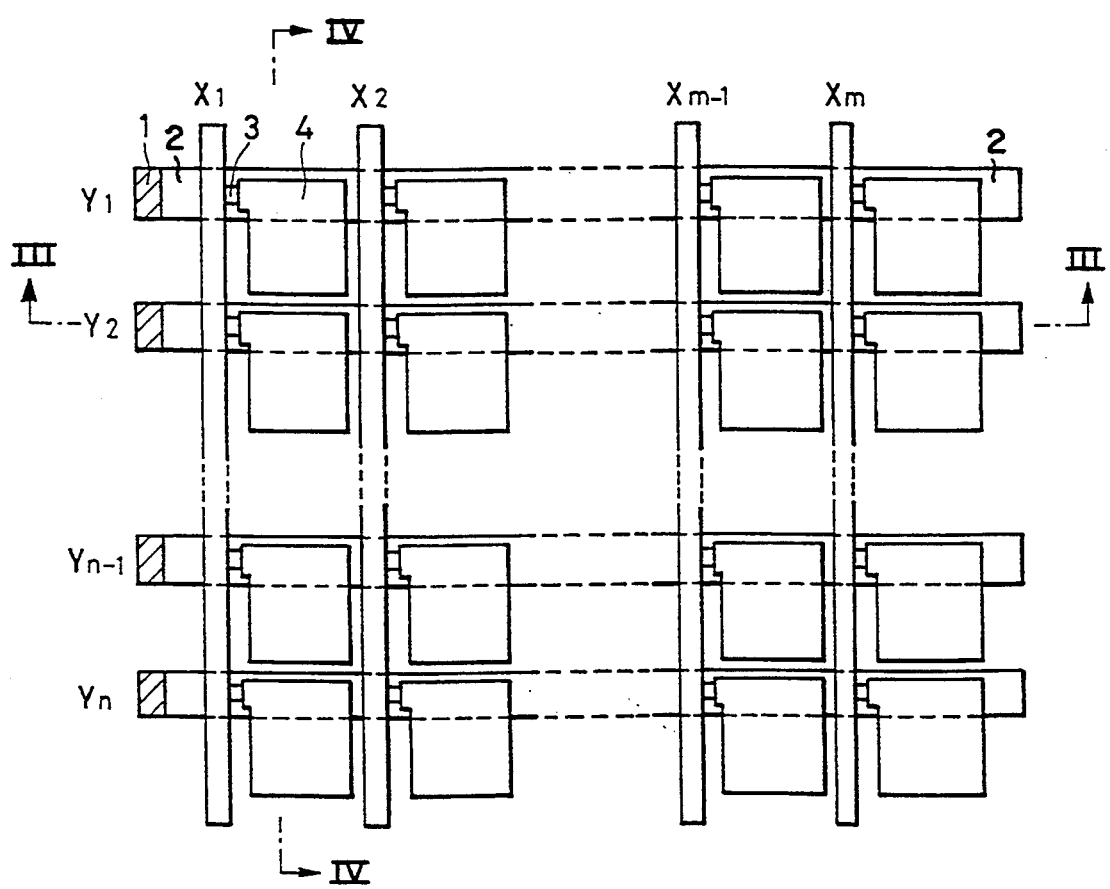
FIG. 2 is a plane view showing the optical scan type liquid crystal display device according to the first embodiment of the invention.
Figure 3:
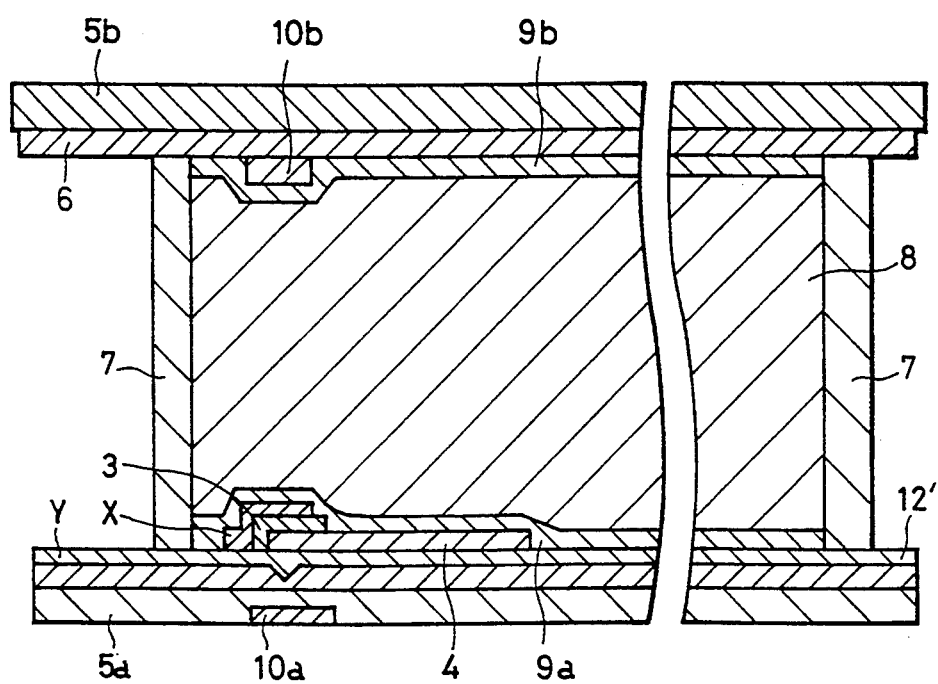
FIG. 3 is a section view on the A—A line of FIG. 2 showing the optical scan type liquid crystal display device according to the first embodiment.
Figure 4:
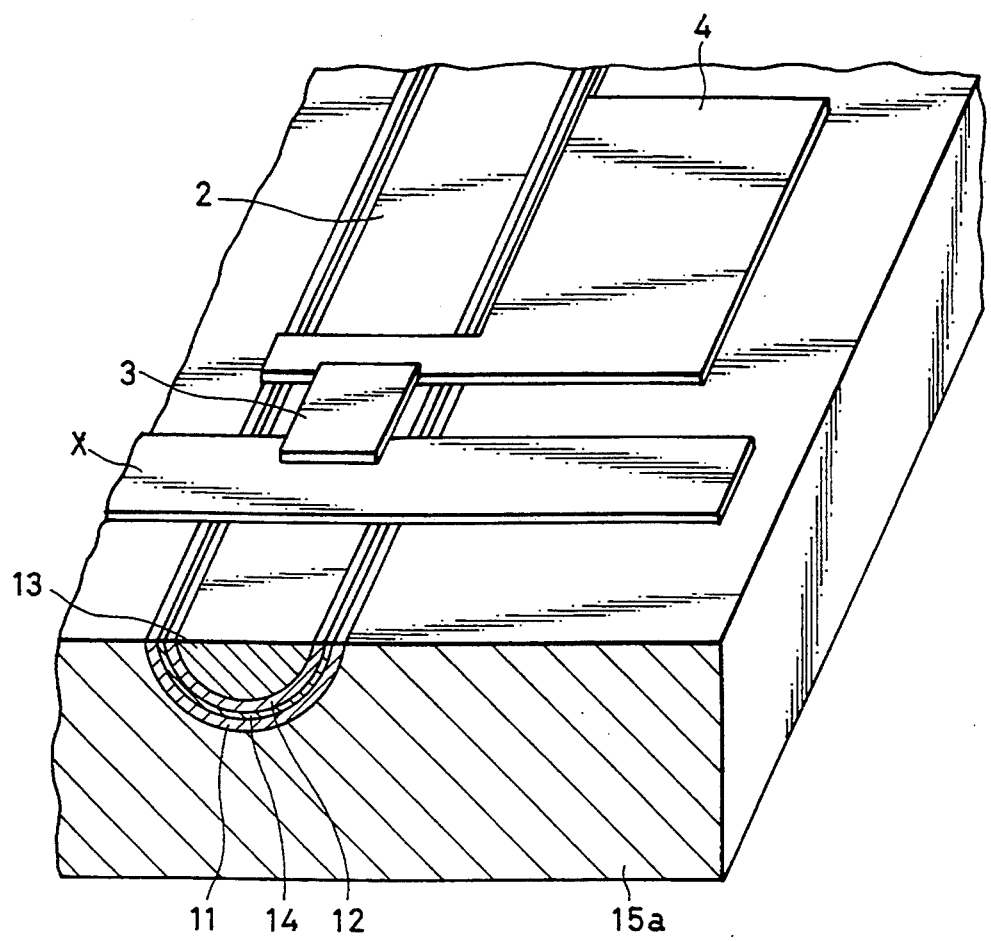
FIG. 4 is a section view on the B—B line of FIG. 2 showing the optical scan type liquid crystal display device according to the first embodiment.

Referring to FIGS. 2 to 4, the first embodiment according to the present invention will be described in detail.

As shown in FIG. 2, each linear luminous source 1 is made of a luminous portion 1 and a linear optical waveguide 2 for transmitting light applied from the luminous portion 1. The luminous portion 1 is made of a laser diode (LD) array element. By activating the luminous portion 1, the light is propagated through the optical waveguide 2.

FIG. 3 is a section on the A—A line of FIG. 2 showing this embodiment.

On one glass substrate 5a, a plurality of linear luminous sources Y ($Y_1, Y_2, \ldots, Y_{n-1}, Y_n$) are located in parallel in the vertical direction of FIG. 2. On those linear luminous sources, a plurality of linear electrodes X ($X_1, X_2, \ldots X_{m-1}, X_m$) are ranged in parallel in the horizontal direction of FIG. 2.

Then, the optical waveguide 2 will be discussed as referring to FIG. 4, which is a section on the B—B line of FIG. 2 showing this embodiment.

As the luminous portion 1, the LD array is used in this structure. In place, a light-emitting diode (LED) array element, an electroluminescent (EL) array element, or a vacuum fluorescent display (VFD) array element may be used. In light of luminance and responsiveness, it is preferable to use the LED array element, an LD array element or a VFD array element.

As shown in FIG. 4, the optical waveguide 2 is formed in a manner that it is buried in the glass substrate 15a. The optical waveguide 2 has a semicircular section, the surface of which is on the same level as the surface of the glass substrate 15a. The optical waveguide 2 is made of an optical fiber. The optical fiber has a light cut-off layer 11 and a core portion 13, which are exposed to the surface of the substrate. An adhesive layer 14 is laid between the light cut-off layer 11 and the optical fiber.

The optical waveguide 2 shown in FIG. 4 is formed as below.

At first, a groove is formed on the glass substrate 15a by using a wire-saw. The optical fiber is made of a clad portion 12 and a core portion 13. The width of the groove is defined by the diameter of the clad portion 12 of the optical fiber Z. Since the allowance for the light cut-off layer 11 and the adhesive agent 14 has to be considered, it is necessary to add about 5 μm to 100 μm, preferably 10 μm to 50 μm to the actual diameter of the clad portion.

In the case of using the quartz system fiber, the diameter of the clad is 125 μm, so that the width of the groove may be set as 150 μm. In the case of using the plastic system fiber, the diameter of the clad is 125 μm or more. Since the allowance for the light switching element 3 and the pixel electrode 4 has to be considered, it is preferable to used the clad with a diameter of 125 μm to 750 μm. Preferably, hence, the width of the groove may be set as 130 μm to 800 μm.

The depth of the groove is determined by the clad diameter and the core diameter of the used optical fiber. The core portion is required to be exposed from the substrate. In the case of using a quartz system fiber having a clad diameter of 125 μm and a core diameter of 50 μm, it is necessary to set the depth of the groove to 65 μm to 120 μm, preferably, 100 μm for exposing the core portion 13 from the substrate. This holds true to the plastic system fiber.

The pitch of the grooves is determined on the size of the pixel electrode 4, which may be 150 μm to 800 μm, preferably, 300 μm to 600 μm. The shown bottom form of the groove is semicircular. In place, it may be tabular. Preferably, the bottom form should be round, since the fiber is fitted to the round bottom of the groove.

Though glass is used for forming the substrate in this embodiment, a fiber plate may be used for improving directives of light. Though the glass substrate is mechanically worked by using the wire-saw herein, for working it, it is possible to use a blade, a chemical working method such as the etching method, a sand-blasting method or the like.

An aluminium (Al) layer 11 is formed as a light cut-off layer or a reflective layer in the groove by means of an electron beam (EB) deposition technique. Then, the aluminium layer 11 is patterned by an etching process. In this case, to prevent leakage of a linear electrode formed thereon, patterning should be executed in order not to project Al to the surface of the glass. As the light cut-off layer or the reflective layer 11, in place of Al, metal such as Mo may be used or a dielectric layer may be formed.

To form only the light cut-off layer, an organic pigment dispersed resin, an inorganic pigment dispersed resin or cermet may be used. In the case of using the high-resistance material, it may be projected out of the surface of the glass, because the linear electrode may not be leaked.

On the light cut-off layer or the reflective layer 11, the optical fiber is located and is pasted by an epoxy resin 14. The core portion 13 is exposed and the surface of the substrate is abraded for leveling it. This abrasion is continued until the propagation loss of the substrate reaches 0.1 dB/cm or less. At first, by using relatively coarse abrasive particles, for example, particles of #300 to #1000, the pre-working is done. Then, by using abrasive particles of #1000 to #4000, the surface is mirror-finished. It is possible to use abrasive particles of #4000 or more for necessary finishing accuracy. In the current state, the size of #4000 may be enough large to obtain sufficient accuracy. As the abrasive particles, a cast iron fiber bond diamond abrasive stone may be used. As a technique for,mirror abrasion, The Institute of Physical and Chemical Research (of Japan) has reported an ELID mirror abrading method arranged by compounding a metal bond super abrasive stone and an electric field in-process dressing technique ("Optical Technique Contact", 30 (4), 221 to 230 (1992)). As the adhesive agent 14, it is preferable to use a polyimide system resin having superior heat-resistance.

At the crossing portion between the linear luminous portion Y and the linear electrode X, the light switching element 3 is formed close to the linear luminous source Y. The light switching element 3 is formed by forming an amorphous silicon hydride (a-Si:h) film by means of the plasma chemical vapor deposition method and etching it for patterning.

For forming the light switching element 3, in place of a-Si:H, it is possible to adjustably use amorphous silicon germanium hydride (a-SiGe:H), amorphous silicon carbide hydride (a-SiC:H), amorphous silicon oxide hydride (a-SiO:H), or amorphous silicon nitride hydride (a-SiN:H) for fitting to the wavelength of the luminous source 1.

Then, for forming the linear electrode X, metal such as Al is deposited by means of the electron beam (EB) deposition technique and is patterned by the etching technique. In place of Al, metal like Mo or a transparent material like indium tin oxide (ITO) may be used. In this embodiment, the electrode structure of the light switching element 3 may be a sandwich type or a planar type.

On the other hand, for forming the pixel electrode 4, an ITO film is deposited by the sputtering technique and is patterned by the etching technique.

On these layers, an orientation layer 9a is formed (see FIG. 3). The orientation layer 9a is formed by performing the rubbing treatment on a polyimide film formed by a spinner. In place of using the spinner, a printing method may be used.

In FIG. 3, on the other glass substrate 5b, a transparent electrode 6 is formed. This transparent electrode 6 is formed by depositing ITO thereon. For the deposition, the sputtering technique may be used. On this transparent electrode 6, a light cut-off layer 10b is formed in a manner to match to the pattern of the light switching element 3 consisting of a photoconductive layer formed on the opposed substrate. This light cut-off layer 10b is deposited by the EB deposition technique and is etched.

As this light cut-off layer 10b, in place of Al, metal such as Mo, an organic pigment dispersed resin and an inorganic pigment dispersed resin may be used. In place of forming it on the transparent electrode 6, it may be formed on the rear surface of the glass substrate 5b.

Further, an orientation film 9b is formed on these layers. This orientation film 9b is formed by rubbing a polyimide film formed by a spinner. In place of the spinner, the printing method may be used.

A space 15 (not shown) is dispersed between the substrates having the layers formed as described above and both of the substrates are pasted by a sealing member 7.

Liquid crystal is injected between these substrates for forming a liquid crystal layer 8. The thickness of the liquid crystal layer is about 5 μm. The display mode is a twisted nematic (TN) normally white type. As the liquid crystal, the PCH liquid crystal ZLI-1565 manufactured by the Merck company may be used. By injecting the liquid crystal in vacuum, the liquid crystal layer 8 is formed.

In this embodiment, the liquid crystal display device employs a TN mode liquid crystal. As the liquid crystal display mode, for the nematic liquid crystal, a guest host mode, an electric-field control birefringence (ECB) mode, a super twisted nematic (STN) mode, or a phase transition mode may be used. In addition, for the chiral smectic liquid crystal, it is possible to use a surface stabilizing ferroelectric liquid crystal (SSFLC) mode or a polymer dispersed type liquid crystal (PDLC) mode using a compound film consisting of polymer and liquid crystal.

When a ray of light is applied to the light switching element 3, that is, the linear luminous source Y is made active, the light switching element 3 lowers its impedance so that the signal from the linear electrode X is applied to the pixel electrode, thereby changing the orienting state of the liquid crystal.

Though the optical fiber made of the clad portion 12 and the core portion 13 is used as the optical waveguide Y, it is possible to use the optical fiber having a light cut-off layer 11 prelocated around the clad layer. In this case, the light cut-off layer 11 made of Al is not required to be formed in the groove.

In the liquid crystal display structure, in particular, the transparent type liquid crystal display device is shown. By using a light-reflective material such as a metal film for the pixel electrode, it may be formed as a reflective type liquid crystal display device. Further, by adding a color filter in the panel, color representation is made possible.

Further, this embodiment has been described about the liquid crystal display device (LCD) using liquid crystal as a display medium. The similar effect can be obtained by the display device using another medium such as an electrochromic display device (ECD) and an electrophoretic display device (EPD).

[Embodiment 2]

The description will be oriented to another embodiment about a method for forming an optical waveguide Y which applies to the optical scan type liquid crystal display device according to this invention.

[Embodiment 2-1]

Figure 5A:
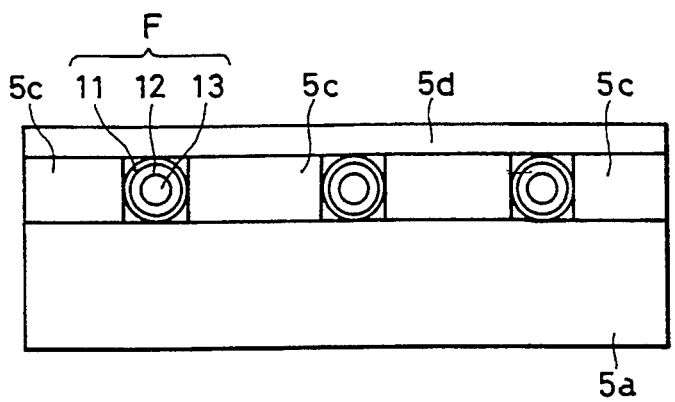
FIG. 5, composed of FIGS. 5a, 5b, and 5c, is a process view showing a method for forming an optical waveguide which may apply to an optical scan type liquid crystal display device according to an embodiment 2-1 of the present invention.
Figure 5B:
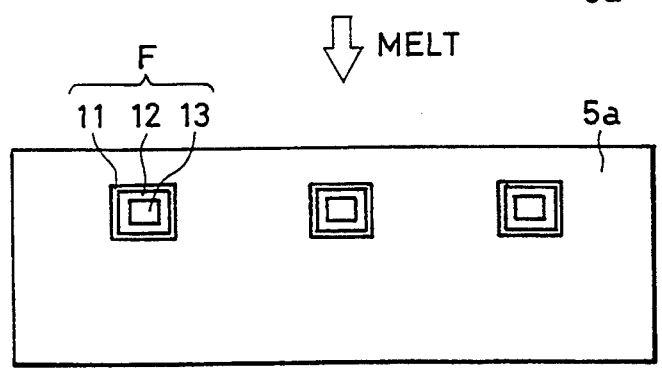
Figure 5C:
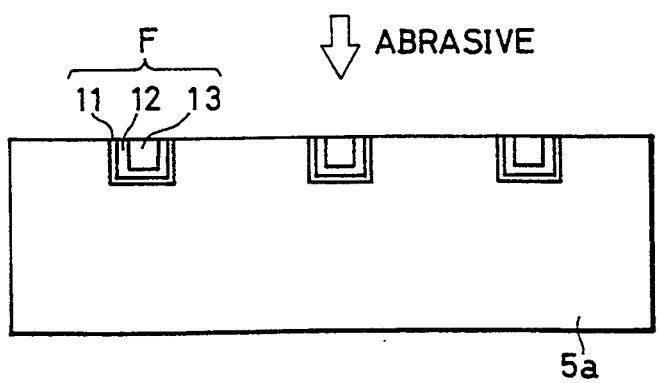

In FIG. 5 composed of FIGS. 5a, 5b, and 5c, the process for manufacturing the optical waveguide Y is illustrated.

At first, as shown in FIG. 5a, optical fibers F and glass substrates 5c are alternately ranged on the surface of the base substrate 5a. The optical fiber has a trilaminar structure consisting of a clad portion 12, a core portion 13 and a light cut-off portion 11. The glass substrate 5c is made of the same material as the base substrate 5a, the thickness of which is equal to the diameter of the optical fiber. The width of the optical fiber is about 50 to 500 μm, preferably 200 to 300 μm for fitting to the size of the pixel. A glass substrate 5d is placed on the optical fiber and the glass substrate 5c. Then, as shown in FIG. 5b, they are heated up to a melting temperature. The glass substrates 5c and 5d are integrally pasted with the base substrate 5a. The optical fiber in square section is buried in the base substrate 5a.

Next, after cooling down the base substrate 5a in which the optical fiber F is buried, as shown in FIG. 5c, the base substrate 5a is abraded for removal in a manner to expose the optical fiber F on the surface of the base substrate 5a. In succession, the parts of the light cut-off layer 11 and the clad layer 12 of the optical fiber F exposed onto the surface of the base substrate 5a are abraded for removal. At this abrasion, the clad layer 12 on the surface of the base substrate 5a is required to be left in such an extent that the light propagated through the optical waveguide Y is not leaked into the surface of the base substrate 5a (the left portion is about 1 μm or more, though it depends on the index of refraction of the core layer 13 and the clad layer 12). The surface of the substrate to which the optical waveguide is attached is mirror-finished as described with respect to the first embodiment.

Next, at the portion of the surface of the clad layer 12 exposed to the surface of the base substrate 5a, where the light switching element 3 is formed, a flaw is given for forming a light scattering portion, which makes it possible to contact the core layer 13 with the light switching element 3. The diameter of the optical fiber F is defined in the range of 20 to 500 μm, preferably 50 to 100 μm for fitting to the size of the light switching element 3.

In this embodiment 2-1, a portion of the clad layer 12 is left on the surface of the base substrate 5a. In place, the core layer 13 may be exposed from the surface of the base substrate 5a and a film having a lower index of refraction is formed on the core layer 13 in a patterned manner.

In the embodiment 2-1, the optical fiber F is melt with the glass plates 5c and 5d having the same material as the base substrate 5a for forming the optical waveguide Y. Hence, unlike the optical waveguide Y formed by fixing the optical fiber on the base substrate 5a by means of an adhesive agent, there is brought about no distortion resulting from thermal stress between different materials such as resin and glass, caused when heating or cooling the optical fiber. This may, therefore, lower degrade of the optical fiber, resulting in being able to form the highly reliable optical waveguide Y. That is, in the display device having such an optical waveguide Y according to this embodiment 2-1, a light signal is very efficiently applied from the optical waveguide Y to the switching element 3.

The arrangement of the overall device except the optical waveguide Y is the same as the foregoing known arrangement and the embodiment 1.

[Embodiment 2-2]

Later, the description will be oriented to an embodiment 2-2 about a method for forming an optical waveguide Y which may apply to the present invention.

Figure 6A:
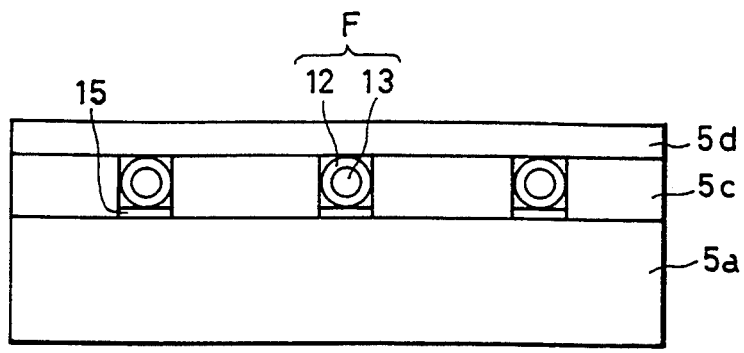
FIG. 6, composed of FIGS. 6a, 6b, and 6c, is a process view showing a method for forming an optical waveguide which may apply to an optical scan type liquid crystal display device according to an embodiment 2-2.
Figure 6B:
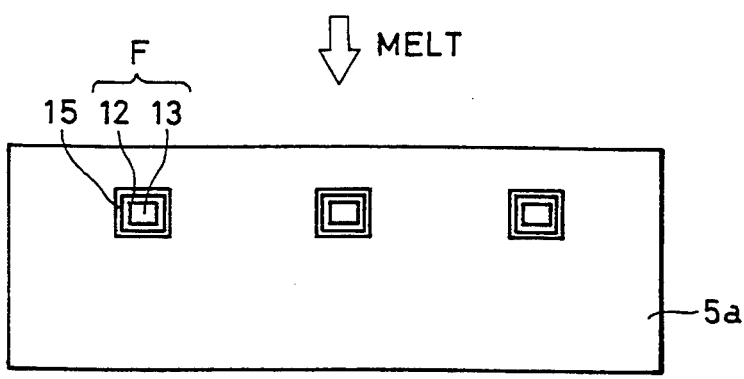
Figure 6C:
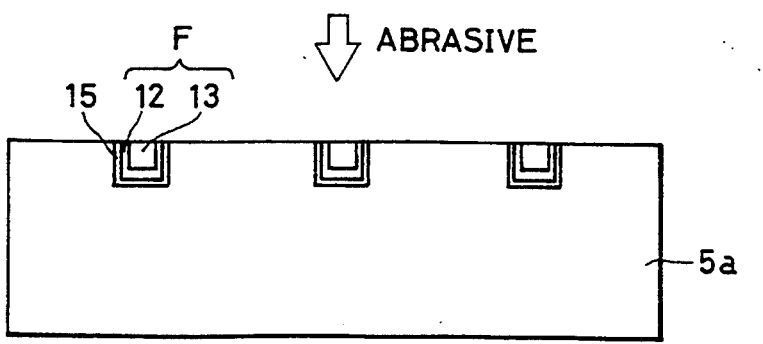

FIG. 6 composed of FIGS. 6a, 6b, and 6c, shows a schematic process for manufacturing the optical waveguide Y in the embodiment 2-2. The same reference numbers of FIG. 6 as those of FIG. 5 indicate the same elements.

As shown in FIG. 6a, optical fibers F and glass plates 5c are alternately ranged on a base substrate 5a. The optical fiber F consists of a core layer 13 and a clad layer 12 wrapping around the core layer 13. The core layer 13 has a circular section. The glass plate 5c has the same material as the base substrate 5a. Between the optical fiber F and the base substrate 5a, there is laid a pre-form of a glass paste 15 (for example, manufactured by Nippon Electric Glass Co., Ltd.). The thickness of the glass plate 5c is an addition of the diameter of the optical fiber F and the thickness of the glass plate 15. The width of the glass plate 5c is set in the range of 50 to 500 μm, preferably 200 to 300 μm for fitting the size of a pixel.

In turn, as shown in FIG. 6b, a glass plate 5d is melt on the optical fiber F and the glass plate 5c. The glass paste 15 is manufactured in order to suit to the characteristics (thermal expansibility, a glass transition point, etc) of the glass substrate 5a, the glass plate 5c, and the optical fiber F. The glass transition point of the glass paste 15 is slightly lower than the base substrate 5a, the glass plate 5c and the optical fiber F. Since the glass paste 15 is black, it also serves as a light cut-off layer. The process after the melting and cooling as shown in FIGS. 6b and 6c is the same as that described with respect to the embodiment 2-1.

This embodiment 2-2 makes it possible to manufacture the optical waveguide Y which offers the similar effect to that of the embodiment 2-1.

[Embodiment 2-3]

The description will be oriented to an embodiment 2-3 about a method for forming the optical waveguide Y which may apply to the present invention.

Figure 7A:
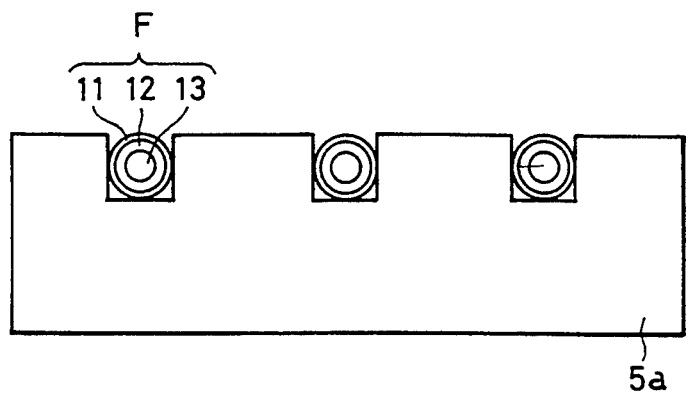
FIG. 7, composed of FIGS. 7a, 7b, and 7c, is a process view showing a method for forming an optical waveguide which may apply to an optical scan type liquid crystal display device according to an embodiment 2-3.
Figure 7B:
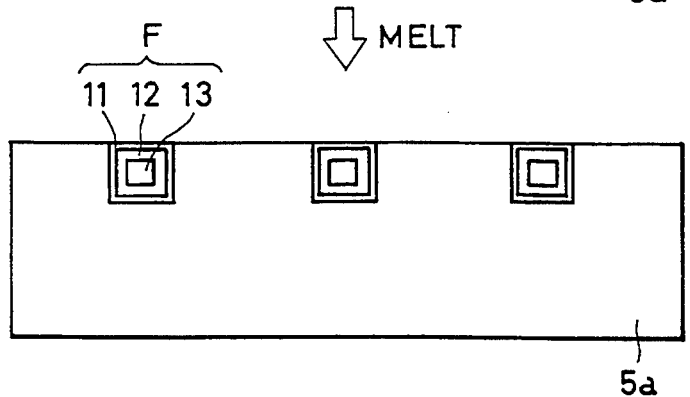
Figure 7C:
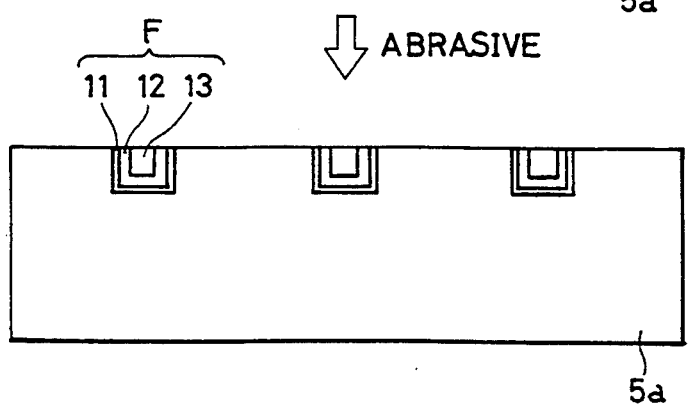

FIG. 7 composed of FIGS. 7a, 7b, 7c, schematically shows a process for forming the optical waveguide Y of this embodiment 2-3. The same reference numbers of FIG. 7 as those of FIG. 5 indicate the same elements.

At first, on the surface of the base substrate 5a, there is formed a resist having patterns for grooves for burying the optical fiber F. Next, the grooves are formed by using the sand-blasting method for removing the resist. The optical fiber F is fitted and melt to the groove. The optical fiber F is a circular section and a trilaminar structure consisting of a core layer 13, a clad layer 12 wrapping around the core layer 13, and a light cut-off layer 11 located at the outmost. In this embodiment, the groove is square in section but may be semi-circular in section. As a method for forming grooves in the base substrate 5a, as a mechanical working method, a blade may be used in place of the sand-blasting method. As a chemical working method, an etching method may be referred. Both of the mechanical work and the chemical work are effective.

Preferably, the mechanical work and then the chemical work should be done. In melting, like the embodiment 2-1, the glass plate 5d may be placed on them. After finishing the melt, it is necessary to remove the glass plate 5d by abrasion. The process after melting and cooling as shown in FIGS. 7b and 7c is the same as that described with respect to the embodiments 2-1 and 2-2.

This embodiment 2-3 makes it possible to manufacture the optical waveguide Y which offers the similar effect to that manufactured according to the embodiments 2-1 and 2-2.

[Embodiment 2-4]

Then, the description will be oriented to an embodiment 2-4 about a method for forming an optical waveguide Y which may apply to the present invention.

Figure 8A:
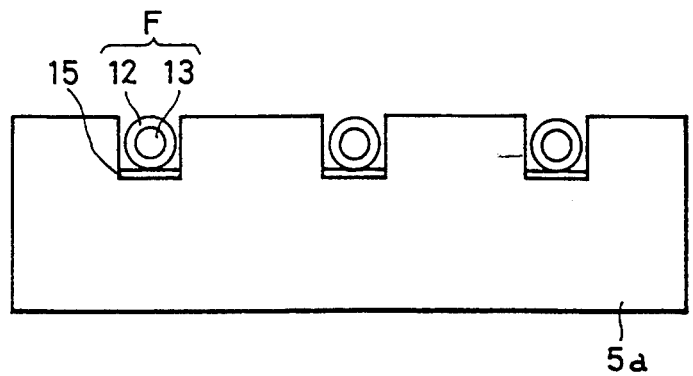
FIG. 8, composed of FIGS. 8a, 8b, and 8c, is a process view showing a method for forming an optical waveguide which may apply to an optical scan type liquid crystal display device according to an embodiment 2-4.
Figure 8B:
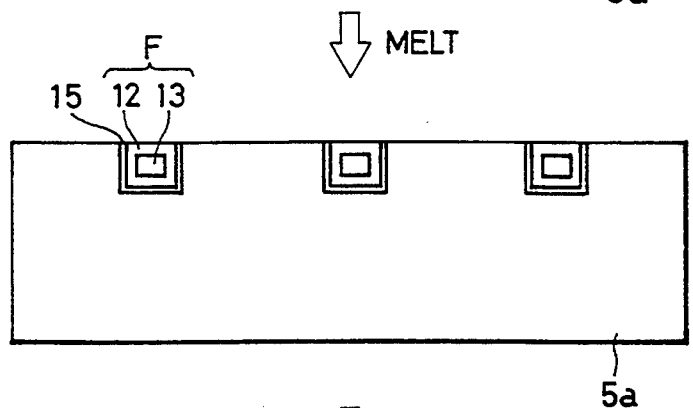
Figure 8C:
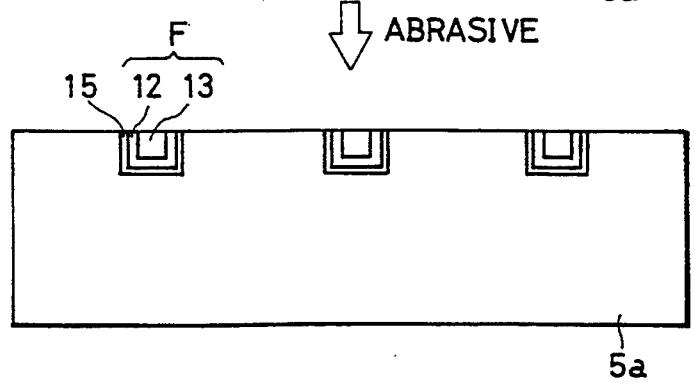

FIG. 8 composed of FIGS. 8a, 8b, and 8c, schematically shows a process for manufacturing the optical waveguide Y according to the embodiment 2-4. The same reference numbers of FIG. 8 as those of FIG. 5 indicate the same elements.

As shown in FIG. 8a, on the surface of the base substrate 5a, there is formed a resist having patterns for grooves for burying the optical fiber F. Then, the grooves are formed by using the sand-blasting method and then the resist is removed. The pre-form 15 of the glass paste (for example, manufactured by Nippon Electric Glass Co., Ltd.) and then the optical fiber F (consisting of a clad layer 12 and a core layer 13) are fitted and melt to each of the grooves. The process after melting and cooling as shown in FIGS. 8b and 8c is the same as that of the embodiment 2-3. The embodiment 2-4 also makes it possible to manufacture the optical waveguide Y which offers the similar effect to that of the embodiments 2-1 to 2-3.

Next, the description will be oriented to the light switching element 8 used in the optical scan type liquid crystal display device according to the invention. The light switching element 8 may take the embodiments 8 to 5. The other part rather than the light switching element 3 may take the structure described about the embodiments 1 and 2.

[Embodiment 3]

In this embodiment 3, the light switching element 3 will be discussed.

First, as referring to FIGS. 2 and 3, a part of the light switching element 3 is overlapped on the pixel electrode 4. This overlapped part is vertically laid between the signal wire X and the pixel electrode 4. The other end of the light switching element 3 is formed on the optical waveguide Y. On the outer surface of the base substrate 5a, the light cut-off layer 10a is formed at the location corresponding to the place where the light switching element 3 is formed. Each optical waveguide Y is semicircular in section and consists of the core layer 13 and the clad layer 13 wrapping around the core layer 13. The optical waveguide Y is buried in the glass substrate 5a. In the embodiment 1, as the optical waveguide Y, a quartz system optical fiber is used. In place, the optical fiber may be a plastic system or multi-component glass system. On the overall surface of the glass substrate 5a, an $SiO_2$ film is formed for serving as a clad layer 12'.

Figure 9:
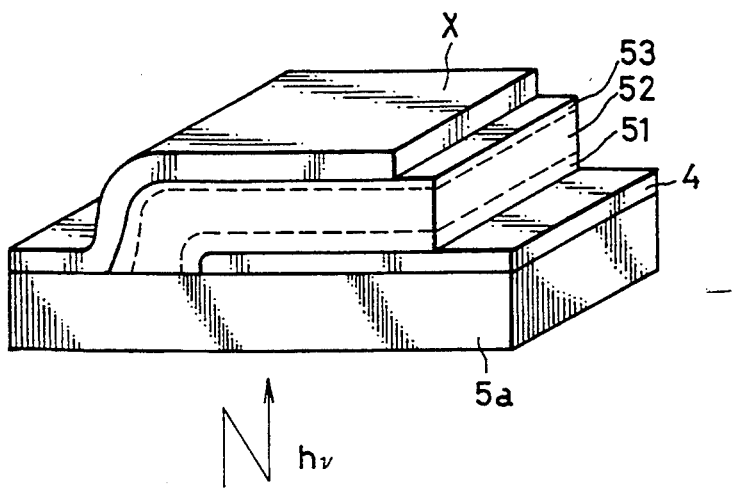
FIG. 9 is a perspective view showing a light switching element which may apply to an optical scan type liquid crystal display device according to an embodiment 3 of the invention.

FIG. 9 shows the light switching element 3 according to the embodiment 3. This light switching element 3 is structured so that the clad layer 12 (omitted here for ease of illustration) is formed on the base substrate 5a and the pixel electrode 4 is formed on the clad layer 12 by means of the sputtering technique. The pixel electrode 4 may be a transparent conductive ITO film. On the pixel electrode 4, a p-type a-Si:H layer 51 (referred to as a p-type 51, which holds true to the i-type and the n-type.), an i-type layer 52, and an n-type layer 53, served as a photoconductive material, are laminated by the plasma CVD method. The p-type layer 51 and the n-type layer 53 are formed by a doping gas of $B_2H_6$ and $PH_3$ and an $SiH_4$ gas. The thickness of each layer is about 100 nm. The i-type layer 52 is formed by using the $SiH_4$ gas. The thickness is about 750 nm. Each thickness may be changed according to the requested element performance. On these layers, the signal wire X is formed.

Figure 10:
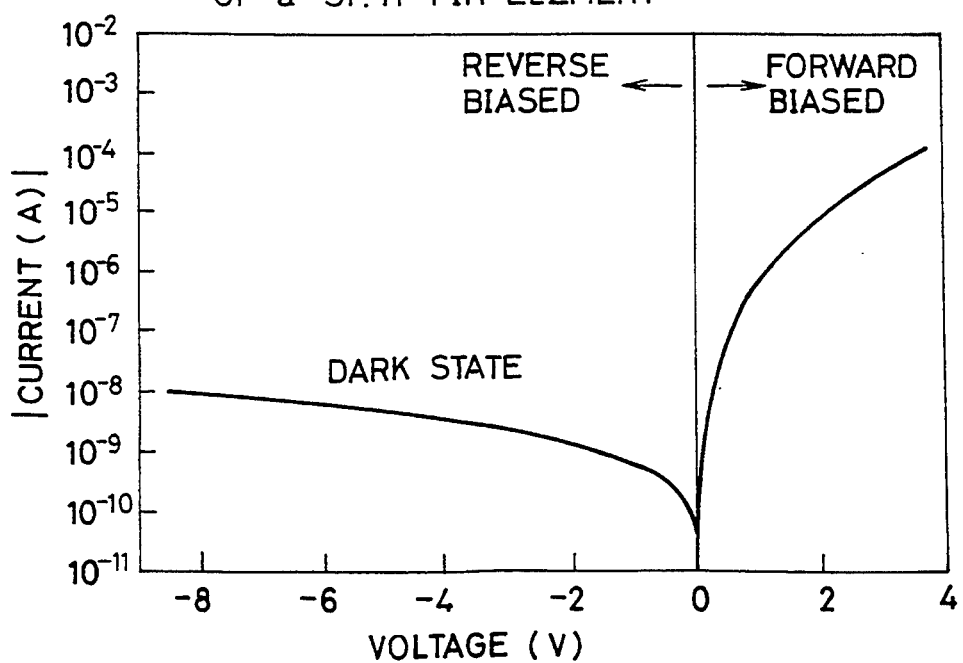
FIG. 10 is a graph showing a voltage to current characteristic appearing when the switching element having the structure shown in FIG. 9 is in the dark state.

The light switching element 3 of this embodiment 3 will be discussed in more detail. FIG. 10 is a graph showing a measured result about a voltage to current characteristic in the dark state of the element having the same structure as the light switching element 3. As is understood from the graph, it is assured that the pin diode keeps high impedance when it is reversely biased. The energy barrier of the semiconductor serves to inhibit injection of carriers from the electrode. By using the characteristic of the pin diode when it is reversely biased, therefore, the light switching element 3 may change its impedance according to the bright or the dark state indicated by the light signal. The light switching element 3 may take the structure shown in FIG. 9 as well as the structure in which the sequence of the p-type layer and the n-type layer is reversed to that of the former structure. In either structure, it is preferable to drive the light switching element 3 with one side of the diode being reversely biased for suiting to the characteristic of the diode. This is because it is necessary to utilize the characteristic of the reversely biased diode.

As the photoconductive material used in the light switching element 3, in place of a-Si:H, amorphous silicon germanium hydride (a-SiGe$_x$:H) may be used with respect to the ray of light having a near infrared wavelength. The film of a-SiGe$_x$:H is formed by the plasma CVD method using $SiH_4$ gas and $GeH_4$ gas. By using doping gas of $B_2H_6$ and $PH_3$, p-type and n-type a-SiGe$_x$:H may be formed. In general, the LD or LED suited to the near infrared wavelength (800 nm to 1000 nm) has been developed for optical communication and thereby is relatively inexpensive. The high output type LD or LED has been developed. If, therefore, such light sources are used for radiating a light scan signal, it is preferable to form the light switching element 3 by using the material of a-SiGe$_x$:H, because it is very sensitive to the ray of light with a near infrared wavelength. By considering the characteristic of the sensitivity to the wavelength of the used ray of light, as the photoconductor, it is also possible to use as a photoconductive material a-SiC$_x$:H, a-SiN$_x$:H, a-SiO$_x$:H, a-SiSn$_x$:H, and a-SiO$_x$N$_y$:H.

Under the circumstance, the embodiment 3 uses an optical fiber as an optical waveguide Y for efficiently propagating a light signal emitted from the luminous portion 1 to the light switching element 3. By this, the intensity change, bright or dark, of the light applied to the light switching element 3 may be made larger. The impedance change (on/off ratio) of the light switching element 3 is made larger accordingly. Further, for applying the light signal from the optical waveguide Y to the light switching element 3, this embodiment 3 does not use a structure where light is linearly leaked on the upper surface of the optical waveguide Y but uses a light scattering portion only at the location of the optical waveguide Y where each light switching element 3 is formed. Hence, it is possible to efficiently apply a ray of light from the optical waveguide Y and the light switching element 3 concentratively through the effect of this light scattering portion.

As described above, the liquid crystal display device according to the embodiment 3 uses the diode structure for the light switching element 3 and the optical fiber having an excellent light-guiding characteristic for the optical waveguide Y. Through the synergistic effect of both, the display performance is further improved. Hence, this embodiment 3 makes it possible to easily realize a high-definition display even in a large display like a diagonally 40-inch high-definition TV, and so on.

The foregoing description has concerned with the structure wherein as to the light switching element having the diode structure, by using the characteristic of the reversely biased diode, the switching characteristic for dark or bright is improved. By using the characteristic of the forward biased diode for the bright state and the characteristic of the reversely biased diode for the dark state, the switching characteristic may be also improved.

[Embodiment 4]

The description will be oriented to the light switching element 3 according to the embodiment 4.

In this embodiment 4, in the semiconductor layer of the pin diode composing the light switching element 3 according to the embodiment 3, the n-type and the p-type semiconductor material used therefor provide a wider band gap than the i-type semiconductor material. By this, the light switching element is more improved.

For example, in the case of using the a-Si:H film as the i-type semiconductor layer as described about the embodiment 3, as the n-type and the p-type semiconductor layer, the a-SiC$_x$:H film with a wider band gap should be used. The embodiment 2 employs the light switching element 3 which has as one of the materials such an a-SiC$_x$:H film.

Figure 11:
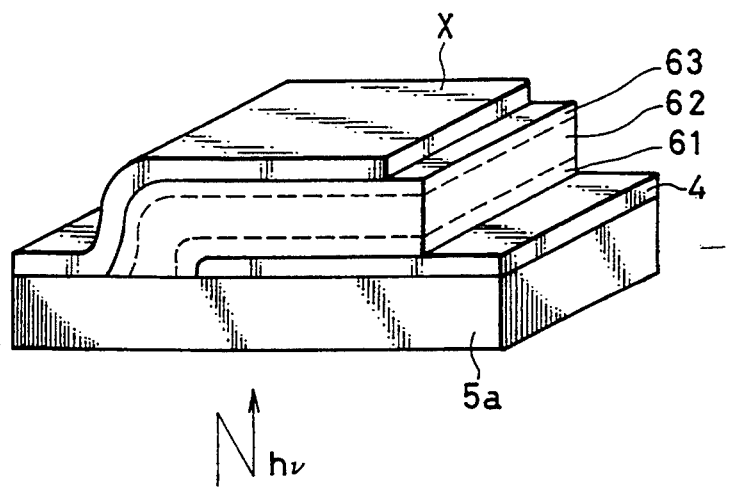
FIG. 11 is a perspective view showing a light switching element which may apply to an optical scan type liquid crystal display device according to an embodiment 4.

FIG. 11 shows the light switching element 3 provided in the liquid crystal display device according to the embodiment 4. The arrangement of the liquid crystal display except the light switching element 1 is the same as that of the embodiment 1. The same reference numbers of FIG. 11 as those of the above figures indicate the same elements.

On the base substrate 5a, the pixel electrode 4 is formed as a transparent conductive ITO film by using the sputtering technique. On this pixel electrode 4, a p-type a-SiC$_x$:H film 61, an i-type a-Si:H film 62, and an n-type a-Si:H film 63 are laminated in the describing sequence. That is, for the side of the base substrate 5a, that is, the doping layer on which the ray of light is applied, the material of a wide band gap is used. On the lamination, the signal wire X is formed. The a-SiC$_x$:H film is formed by the CVD technique using SiH$_4$ gas and CH$_4$ gas.

By using the doping gas of B$_2$H$_6$ and PH$_3$, the p-type and the n-type a-SiC$_x$:H are allowed to be formed. The band gaps of the a-Si:H and a-SiC$_x$:H are respectively 1.72 eV and 1.9 eV as a result of measuring a spectrum absorbed on a single layer. Consider that the light switching element 3 has a hereto-junction type pin structure keeping such values of the wide band gaps. In the case of using a ray of light having a wide wavelength band for the light scan signal, the p-type a-SiC$_x$:H with a wide band gap does not absorb light on the side of a short wavelength so much. Hence, the light is mainly absorbed by the i-type a-Si:H to which an electric field is strongly applied. It means that the effective use of light is realized.

As a material of a wide band gap used in the embodiment 4, in place of a-SiC$_x$:H (Eg=1.7 to 2.8 eV), it is possible to use a-SiN$_x$:H (Eg=1.7 to 5.5 eV), a-SiO$_x$:H, and a-SiO$_x$N$_y$:H. Further, as an additional material, a-Si:H (Eg=1.6 to 2.0 eV), a-SiGe$_x$:H (Eg=1.3 to 1.7 eV) and a-SiSn$_x$:H (Eg=1.0 to 1.8 eV) may be referred.

In the liquid crystal display device according to the embodiment 4, the light switching element 3 uses a diode structure and the optical waveguide Y uses an optical fiber having an excellent light-guiding characteristic. Like the embodiment 3, therefore, through the synergistic effect of both, the display performance is more improved. The high-definition display is allowed to be easily realized even in the large display device like a diagonally 40-inch high-definition TV.

The foregoing description has concerned with the structure wherein as to the light switching element having the diode structure, by using the characteristic of the reversely biased diode, the switching characteristic for dark or bright is improved. By using the characteristic of the forward biased diode for the bright state and the characteristic of the reversely biased diode for the dark state, the switching characteristic may be also improved.

[Embodiment 5]

The light switching element 3 according to the embodiment 5 of the invention will be discussed in detail.

The liquid crystal display device according to the embodiments 2 and 3 provides the light switching element 3 having the pin structure or the hetero-junction type pin structure of the semiconductor for achieving the diode characteristic, while the liquid crystal display device according to the embodiment 5 provides a simpler diode structure without using a doping layer of the semiconductor. That is, this embodiment 5 uses a Schottky diode structure for forming the light switching element 3.

Figure 12:
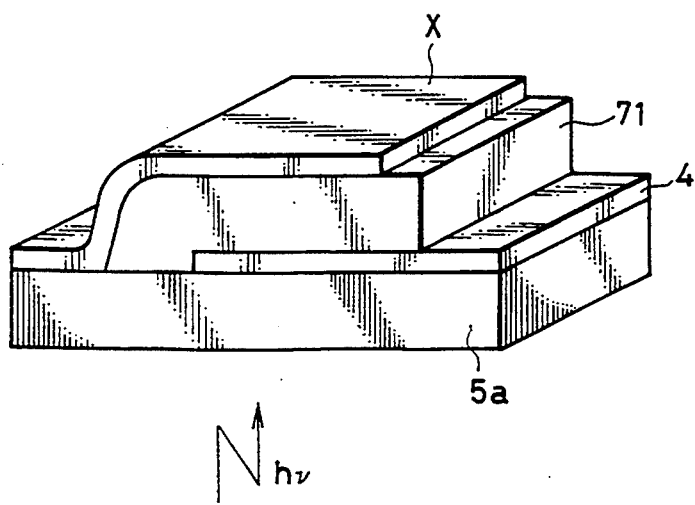
FIG. 12 is a perspective view showing a light switching element which may apply to an optical scan type liquid crystal display device according to an embodiment 5.

FIG. 12 shows the detail of the light switching element provided in the liquid crystal display device according to the embodiment 5. The arrangement of this embodiment except the light switching element 3 is the same as that of the embodiment 3. The same reference numbers of this description as those of the above figures indicate the same elements.

On the base substrate 5a, the pixel electrode 4 is formed as a transparent conductive ITO film by means of the sputtering technique. On this pixel electrode 4, the a-Si:H film 71 is formed by the plasma CVD method. The thickness of the film is about 1 μm. The thickness may be variable depending on the requested element performance. On the pixel electrode 4, the signal wire X is formed of Al by the sputtering technique. In this light switching element 3, therefore, the Schottky barrier has a more great effect on the interface made of ITO/a-Si:H than the interface of Al/a-Si:H. The light switching element 3 composes a Schottky diode.

Figure 13:
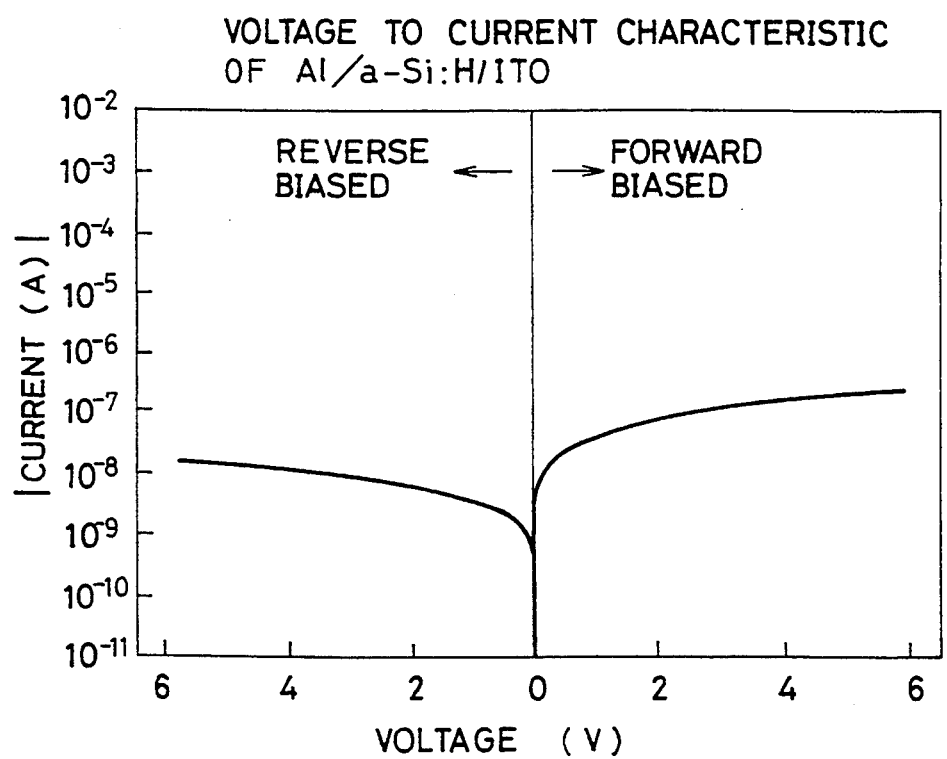
FIG. 13 is a graph showing a voltage to current characteristic appearing when the switching element having the structure shown in FIG. 12 is in the dark state.

FIG. 13 is a graph showing a measured result about a voltage to current characteristic in the dark state in the element having the same structure as that of the embodiment 5. When the Schottky diode is reversely biased, this element keeps high impedance. This is because the Schottky barrier serves to inhibit injection of carriers from the electrode. This embodiment 5 makes it possible to offer the same effect as the embodiment 3 and a simpler manufacturing process since it does not need the doping layer of the semiconductor.

As a material of the Schottky electrode against a-Si:H, it is possible to use a transparent conductive film made of SnO$_2$ in addition to ITO. As a material of a linear electrode, Pd, Cr, Ti, Ni and Mo may be used in place of Al. The effect of the Schottky barrier on the interface with the photoconductive material is variable depending on the used electrode material. The diode characteristic changes according to the effect. Hence, the electrode material should be selected according to the specification. In actual, it is preferable to use one material for the Schottky electrode and the pixel electrode, because they may be used in common.

In the liquid crystal display device according to the embodiment 5, the light switching element 3 uses the diode structure and the optical waveguide Y uses the optical fiber having an excellent photoconductive characteristic. Like the embodiments 3 and 4, therefore, through the synergistic effect of both the switching element and the optical waveguide Y, the display performance is more improved. This embodiment 5, therefore, makes it possible to easily realize the high-definition display even in a large display device like a diagonally 40-inch high-definition TV, and so on.

The foregoing description has concerned with the structure wherein as to the light switching element having the diode structure, by using the characteristic of the reversely biased diode, the switching characteristic for dark or bright is improved. By using the characteristic of the forward biased diode for the bright state and the characteristic of the reversely biased diode for the dark state, the switching characteristic may be also improved.

Next, the description will be oriented to the scan type liquid crystal display device having a different structure from that shown in FIGS. 3 and 4, which are implemented as embodiments 6 and 7.

[Embodiment 6]

This embodiment 6 is effective in the case of providing the optical waveguide Y on the side of the opposed substrate 5b in the optical scan type active matrix type LCD device, that is, providing the light switching element 3 and the optical waveguide Y on different substrates. The arrangement of this embodiment 6 will be described as referring to FIG. 14. The same reference numbers of this description as those of the above figures indicate the same elements.

Figure 14:
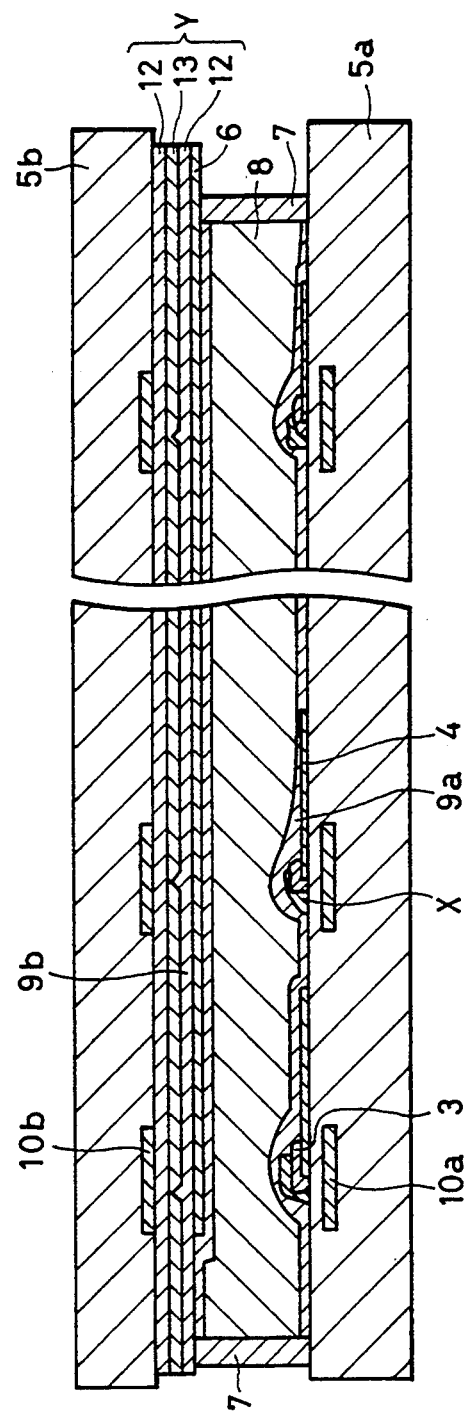
FIG. 14 is a section view showing an optical scan type liquid crystal display device according to an embodiment 6 of the present invention.

As shown in FIG. 14, the basic arrangement of this embodiment is the same as that of the above embodiment, except that the optical waveguide Y is provided on the opposed substrate 5b to the light switching element 3. Like the light switching element 5 described about the embodiments 3 to 5, the light switching element 3 employs such a diode structure. By using the optical fiber for the optical waveguide Y, the switching characteristic is greatly improved.

[Embodiment 7]

The description will be oriented to the optical scan type liquid crystal display device according to the embodiment 7 of the invention, which is effective if it may apply to the active matrix type as well as the duty driving type liquid crystal display device.

Figure 15:
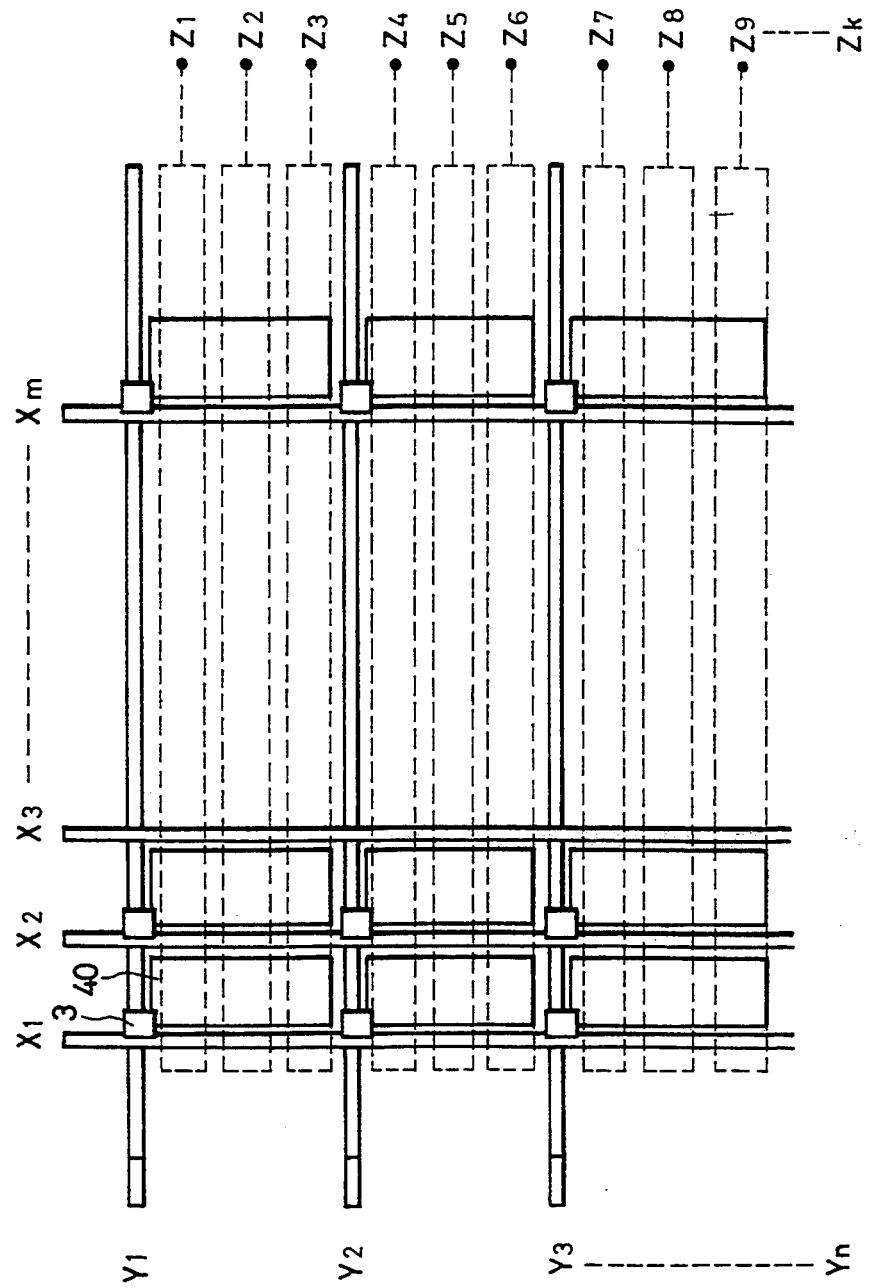
FIG. 15 is a plane view showing an optical scan type liquid crystal display device according to an embodiment 7 of the present invention.

FIG. 15 shows an arrangement of the liquid crystal display device according to the embodiment 7. In this embodiment 7, a plurality of optical waveguides $Y_1, Y_2, \ldots, X_n$ are horizontally ranged on the base substrate. On those optical waveguides, a plurality of signal wires $X_1, X_2, \ldots, X_n$ are vertically ranged so that they may be crossed at right angles with the optical waveguides, respectively. At each of section areas defined by the optical waveguides Y and the signal wires X, a pixel electrode 40 is formed in a manner to bury each section area. At a crossing point between each optical waveguide Y and the signal wire X, a light switching element 3 is formed on each signal wire X. Each signal wire X is connected to the corresponding pixel electrodes 40 through the light switching elements 3, respectively. On the opposed substrate 5b, for example, one combination of three linear electrodes $Z_1, Z_2, \ldots Z_k$ is located in a manner to correspond to between the adjacent optical waveguides Y.

The liquid crystal display device arranged as described above operates as follows. A light scan signal is transmitted to the optical waveguides $Y_1, Y_2, \ldots, Y_n$ in sequence so that each signal wire X may be electrically connected with each pixel electrode 40 in the sequence. At a time, one combination of three linear electrodes for each pixel electrode 40, for example, $Z_1, Z_2$ and $Z_3$ are driven in a simple multiplexing manner. That is, in the embodiment 7, a display area composed of three linear electrodes $Z_1, Z_2$ and $Z_3$ is assumed as one block. The light signal from each optical waveguide Y is used for selecting each block. Hence, the number of scan lines may be tripled as keeping the duty ratio constant. Like the light switching element 3 used in the active matrix type LCD device according to the embodiments 3 to 6, the light switching element 3 serves to switch on and off an electric connection between the signal wire X and the pixel electrode 40 according to the bright or the dark state of the radiated ray of light.

If, therefore, the structure of the light switching element 3 according to the embodiment 7 may take such a diode structure as indicated above and the optical waveguide Y uses the optical fiber, the switching characteristic is greatly improved. As described above, the embodiment 7 makes it possible to achieve higher contrast and larger capacitance display as keeping the minimum number of drivers than the known simple matrix type LCD device.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical scan type display device which is so arranged that a liquid crystal material is sealed between two substrates and said liquid crystal material serves as a display medium, said optical scan type display device comprising:

a plurality of optical waveguides disposed on one of said substrates and arranged in parallel with each other;

a plurality of signal wires disposed on one of said substrates and arranged in parallel with each other in such a direction that said plurality of signal wires cross with said plurality of optical waveguides, respectively;

a plurality of pixel electrodes, each formed in a respective area defined by said plurality of optical waveguides and said plurality of signal wires; and a plurality of light switching elements, each disposed at a respective location where one of said plurality of optical waveguides intersects one of said plurality of signal wires, each of said plurality of light switching elements being adapted to perform a switching function in response to a signal light transmitted through a respective one of said optical waveguides, said plurality of pixel electrodes being arranged in a manner that each of said pixel electrodes is selectively driven in response to a signal applied through one of said plurality of signal wires and one of said light switching elements, said plurality of optical waveguides being formed on said one of two substrates by using an optical fiber, at least an optical switching portion of a surface of one of two substrates being arranged to be flat after forming said optical waveguide, and each optical waveguide being formed by melting an optical fiber onto said one of said two substrates.

2. An optical scan type display device as claimed in claim 1, wherein said one of said substrates has a flatness of said optical waveguide portion within a range of ±0.5 μm.

3. An optical scan type display device as claimed in claim 1, wherein said substrate of said optical waveguide is optically abraded so that a propagation loss therethrough does not exceed 0.1 dB/cm.

4. An optical scan type display device according to claim 3, wherein
all portions, of a surface of said one of two substrates, are arranged to be flat.

5. An optical scan type display device as claimed in claim 4, wherein
said one of said two substrates has a flatness which is within a range of ±0.5 μm.

6. An optical scan type display device as claimed in claim 5, wherein said flatness of said substrate is obtained by polishing to a mirror-finish.

7. An optical scan type display device as claimed in claim 6, wherein said optical fiber provides a light cut-off layer around a clad layer.

8. An optical scan type display device as claimed in claim 7, wherein said optical waveguide is formed by burying optical fibers in grooves provided in said one of two substrates.

9. An optical scan type display device as claimed in claim 1, wherein said switching element is made of a diode.

10. An optical scan type display device as claimed in claim 9, wherein said diode is a pin diode of a semiconductor.

11. An optical scan type display device as claimed in claim 10, wherein said pin diode of said semiconductor is formed of amorphous silicon hydride or amorphous germanium hydride.

12. An optical scan type display device as claimed in claim 9, wherein said diode is a hetero-junction type pin diode of a semiconductor.

13. An optical scan type display device as claimed in claim 12, wherein at least one of a p-type layer and an n-type layer of said hetero-junction type pin diode is formed of a semiconductor material having a larger optical band gap than that of an i-type layer.

14. An optical scan type display device as claimed in claim 13, wherein said hetero-junction type pin diode is formed of amorphous silicon hydride or amorphous silicon germanium hydride.

15. An optical scan type display device as claimed in claim 9, wherein said diode is a Schottky diode.

16. An optical scan type display device as claimed in claim 1 wherein said optical waveguide has a luminous portion and said luminous portion is a light-emitting diode array.

17. An optical scan type display device as claimed in claim 1, wherein said optical waveguide has a luminous portion and said luminous portion is a laser diode array.

18. An optical scan type display device as claimed in claim 1, wherein a driving system of said optical scan type display device is an active matrix driving system.

19. An optical scan type display device as claimed in claim 1, wherein striped opposite electrodes are formed on the other one of said two substrates opposite to said one of two substrates, and a display block composed of a plurality of opposed electrodes is driven in a simple multiplexing manner.

* * * * *

UNITED STATES PATENT AND TRADEMARK OFFICE
CERTIFICATE OF CORRECTION

PATENT NO. : 5,440,411
DATED : AUGUST 8, 1995
INVENTOR(S) : Fujiwara, Hatano & Izumi It is certified that error appears in the above-indentified patent and that said Letters Patent is hereby corrected as shown below:

On the Cover page, item [21], please replace "88,588" with --88,558--.

On the Cover page, item [73], please replace "Isumi" with --Izumi--.

Signed and Sealed this

Twenty-fourth Day of October, 1995

Attest:

BRUCE LEHMAN

*Attesting Officer*        *Commissioner of Patents and Trademarks*